July 8, 1958  P. ROBINSON ET AL  2,842,726
ELECTRICAL CONDENSERS
Filed June 5, 1956

INVENTORS
PRESTON ROBINSON
DAVID B. PECK
BY
Roland A. Dexter
THEIR ATTORNEY

United States Patent Office 2,842,726
Patented July 8, 1958

2,842,726
ELECTRICAL CONDENSERS

Preston Robinson and David B. Peck, Williamstown, Mass., assignors to Sprague Electric Company, North Adams, Mass., a corporation of Massachusetts Application June 5, 1956, Serial No. 589,548

4 Claims. (Cl. 317—258)

This invention relates to improved electrical capacitors and more specifically refers to film capacitors characterized by very high insulation resistance and/or capacitance stability. The present application is a continuation-in-part of our U. S. patent application, Serial No. 316,232, filed October 22, 1952, now U. S. Letters Patent 2,749,490, issued June 5, 1956.

Electrical capacitors are of many types, each of which is characterized by some particular property or properties which lead to its use in certain types of electrical circuit applications. There are, however, a number of circuit requirements for which the existing types of capacitors were unsuited prior to the development of special composite dielectric capacitors disclosed in our above mentioned patent application. One such requirement is a low and controllable temperature coefficient of capacity. For such applications the bulky and expensive mica capacitors have previously been used, being, for practical purposes, limited to the lower capacitance range. For higher capacitance values polystyrene capacitors have met some application requirements for a substantial negative temperature coefficient of capacity, where a very limited operating temperature range can be tolerated.

Another requirement which has become of increasing importance in recent years is the insulation resistance of the capacitor at moderate and at high temperatures. Where capacitors are to be used in circuits for computers, electronically controlled missiles, and the like, the R-C time constant type of circuit is frequently employed. In such an instance it is desirable that the insulation resistance of the capacitor be under all possible operating voltages and temperatures at least two orders of magnitude higher than that of the companion resistor. Otherwise the accuracy of the time constant network is substantially reduced. This problem is particularly aggravated by wide operational temperature limits, particularly those involving temperatures of 125° C. and higher. Paper capacitors are not satisfactory for many of the circuits under consideration.

It is an object of the present invention to overcome the foregoing and related disadvantages. A further object is to produce new and useful electrical capacitors. A still further object is to produce capacitors characterized by extremely low temperature coefficients of capacity combined with high insulation resistance over a wide temperature range. A still further object is to produce capacitors characterized by extremely low temperature coefficients of capacity combined with high insulation resistance over a wide temperature range. A still further object is to produce capacitors characterized by a zero temperature coefficient of capacity and which are capable of operation at high voltages and temperatures without substantial deterioration of the dielectric material.

Additional objects will become apparent from the following description and claims.

These objects are attained in accordance with the present invention wherein there is produced an electrical capacitor comprising convolutely wound electrode elements separated by a composite dielectric spacing material, said material consisting of at least one continuous layer of an at least partially disoriented (relaxed) synthetic resin film, and at least one predominantly oriented synthetic resin film. The temperature coefficients of capacity of the films being such that when the films are combined, the resulting temperature coefficient is extremely low.

In a more restricted sense, the invention is concerned with an electrical capacitor comprising convolutely wound electrode elements separated by a composite dielectric spacing material, said material consisting of at least one continuous film of an at least partially disoriented (relaxed) polyester, and at least one predominantly oriented film of a substituted hydrocarbon polymer.

In one of its limited embodiments the invention is concerned with an electrical capacitor comprising convolutely wound electrode foils separated by a composite dielectric spacing material, said material consisting of a continuous polyethylene terephthalate film abutting a continuous polytetrafluoroethylene film, the ratio between the thickness of said films being from about 1:3 to about 2:3, respectively.

In prior applications we have disclosed the wide outlets of the novel combination of a continuous film of a relaxed or at least partially disoriented dielectric film and a fibrous or film type layer which is oriented and/or non-thermoplastic in nature. The present invention relates to a specific type of such a basic construction, namely the novel combination of two substantially continuous dielectric films, one of which is at least partially disoriented, while the other is substantially completely oriented. Properly disposed between electrodes, this combination results in capacitor characteristics of great utility and which were heretofore unattainable.

The partially or completely disoriented continuous film is preferably linear in chemical structure. A typical and preferred polymer of this type is the condensation polymer of ethylene glycol and terephthalic acid. Other polymers include the polyamides such as nylon; the polyurethanes such as Igamid U, Perlon U; polyacrylonitrile; polyvinylidenechloride; cellulose acetate-sorbate; and various halogenated or otherwise substituted derivatives of these resins. It should be pointed out that the insulation resistance and certain other characteristics of this partially or completely disoriented continuous film need not be the same order of magnitude as that of the oriented film. The partially or completely disoriented film is preferably rolled into the capacitor unit in an oriented condition. This orientation may take place through appropriate stretching of the polymer during any of the well known film forming processes e. g. casting or extruding of these polymers produces completely satisfactory films for my invention.

The continuous substantially oriented films preferably are the substituted hydrocarbon polymers. A typical and preferred example of this type of polymer is the fluorinated ethylene polymers of which polytetrafluoroethylene and polychlorotrifluoroethylene are outstanding examples for our purposes. This film may also be oriented in conventional manner, as by stretching in the forming process.

The films utilized in our invention may be either self supporting or of the deposited type. By deposited type is meant that the films are sprayed or otherwise positioned upon one of the other elements of the capacitor and rely upon that other element for their support.

The ratio of the two films employed, that is the partially disoriented and oriented films, is ordinarily between about 1:3 and 2:3, and the thickness of individual films and gross dielectric spacer thickness are ordinarily from about 0.1 mil to about 2.0 mils, and from about 0.2 mils to about 4.0 mils, respectively. These combinations may be produced in any desired manner with at least one layer of each film being employed. For high voltage service it is desirable to employ a total of at least three films, and often four or more are employed with a structure of alternately oriented and disoriented films. Where high temperature applications are encountered, it is ordinarily desirable to sandwich one oriented layer between two disoriented layers.

Impregnation of such capacitor structures is not ordinarily required, but may be employed for high voltage capacitors. It reduces the possibility of breakdown and/or corona formation in the marginal and terminal areas. Although the two films may be wound into the capacitor in the oriented and partially disoriented states of the finally desired product, it is preferable and advantageous to wind the unit with both of the films having substantial orientation. We ordinarily prefer to process the structure by heating under vacuum from low temperature to a temperature approaching and in some cases exceeding the first order transition point of the resin to be disoriented and at least 10° lower than the disorientation temperature of the resin which is to be maintained in oriented condition. When the two resin films are both wound into the unit in oriented condition, this process of disorientation of one resin by heating has the additional advantageous result of shrinking and tightening the wound unit, by reason of the contraction of the resin which becomes disoriented.

Reference is made to the amended drawing which:

Figure 1:
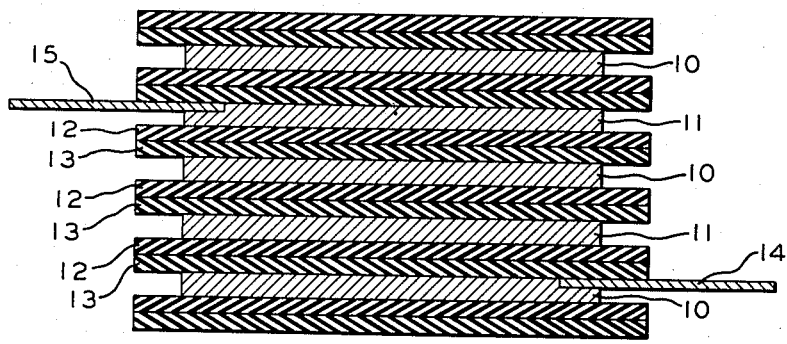
Fig. 1 represents a cross section of a finished capacitor of the invention.

Referring more specifically to Fig. 1, 10 and 11 represent convolutely wound electrode foils separated by a composite dielectric consisting of disoriented films 12 and oriented film 13. Terminal tabs 14 and 15 respectively are of effect electrode foils 10 and 11.

Figure 2:
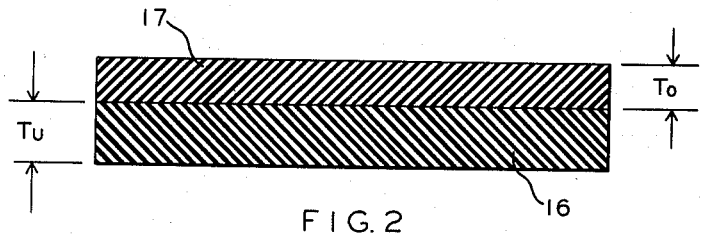
Fig. 2 shows one dielectric combination of the invention.

Fig. 2 shows a cross-section of the composite dielectric spacer of the invention in which $T_u$ represents the thickness of the oriented film 16 while $T_o$ represents the thickness of the disoriented film 17. The ratio between the thicknesses of these two films has been previously referred to. In our preferred embodiment in which the partially disoriented film is of polyethylene terephthalate and the oriented film is of polytetrafluoroethylene, careful control over the relative thickness of the two films will enable the user to match the temperature coefficients of the films so as to obtain a multi-layer dielectric having a zero temperature coefficient of capacity. We have accomplished this feat by utilizing polyethylene terephthalate having a positive temperature coefficient of capacity of about 250 parts per million, and polytetrafluoroethylene having a negative coefficient of about 200 parts per million. This combination of the disoriented polyethylene terephthalate film and an oriented polytetrafluoroethylene film also produces extremely high volume efficiency with good breakdown voltage characteristics and good installation resistance characteristics. In other words, we have discovered that our composite dielectric gives desirable properties that are unobtainable from any of the known capacitor dielectric resin films.

Figure 3:
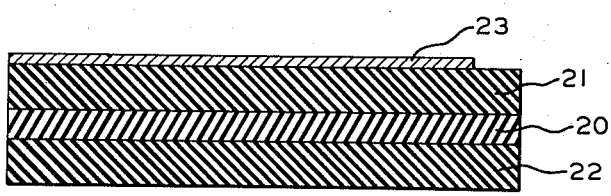
Fig. 3 shows another dielectric combination of the invention.

Fig. 3 represents a cross-section of a typical combination of dielectric materials in accordance with our invention. Numeral 20 represents the at least partially disoriented film sandwiched between oriented films 21 and 22. This, representing one of the preferred structures of this invention, is particularly advantageous where higher voltages and/or temperatures are encountered.

Metallized electrode 23 is bonded to one surface of dielectric layer 21 to demonstrate the utility of our dielectrics in metallized-electrode capacitor structures.

As an example of our invention, a capacitor was constructed by convolutely winding a composite dielectric sandwich, consisting of one layer of oriented polyethylene terephthalate film between two layers of oriented polytetrafluoroethylene film in the above mentioned thickness ratio, and utilizing this sandwich as the dielectric for two aluminum foils used as electrodes. The convolutely wound unit was then heated under vacuum to a temperature above the first order disorientation (relaxation) temperature of the polyethylene terephthalate film, that is 150 to 165° C.; and below the disorientation temperature of the polytetrafluoroethylene film. This heating caused the polyethylene terephthalate film to relax and thereby shrink and compact the entire wound unit into a desirable tightly compacted capacitor section.

Capacitors made according to our process had a substantially zero temperature coefficient of capacity, and had an insulation resistance of over one million megohm microfarads at 85° C. and which dropped to not less than over a half million megohm microfarads at 125° C.

As many apparently widely different embodiments of this invention may be made without departing from the spirit and scope hereof, it is to be understood that the invention is not limited to the specific embodiments hereof except as defined in the appended claims.

What is claimed is:

1. An electrical capacitor having a low temperature coefficient of capacity comprising convolutely wound electrode elements separated by a composite dielectric spacing material, said material consisting of at least one continuous layer of an at least partially disoriented polyethylene terephthalate film and at least one predominantly oriented tetrahaloethylene polymer film.

2. An electrical capacitor having low temperature coefficient of capacity comprising convolutely wound electrode elements separated by a composite dielectric spacing material, said material consisting of at least one continuous film of relaxed polyethylene terephthalate and at least one predominantly oriented fluorinated ethylene polymer film.

3. An electrical capacitor comprising convolutely wound electrode foils separated by a composite dielectric spacing material, said material consisting of a continuous at least partially disoriented polyethylene terephthalate film abutting a continuous substantially oriented polytetrafluoroethylene film, the ratio between the thickness of said films being from about 1:3 to about 2:3 respectively.

4. The capacitor of claim 2 wherein the fluorinated ethylene polymer is polytrifluoromonochloroethylene.

No references cited.